United States Patent [19]

Smith et al.

[11] Patent Number: 4,491,025

[45] Date of Patent: Jan. 1, 1985

[54] PARALLEL PATH CORIOLIS MASS FLOW RATE METER

[75] Inventors: James E. Smith, Boulder; Donald R. Cage, Longmont, both of Colo.

[73] Assignee: Micro Motion, Inc., Boulder, Colo.

[21] Appl. No.: 439,035

[22] Filed: Nov. 3, 1982

[51] Int. Cl.³ .............................................. G01F 1/84
[52] U.S. Cl. ................................................. 73/861.38
[58] Field of Search .............. 73/32 A, 861.37, 861.38

[56] References Cited

U.S. PATENT DOCUMENTS

| | | |
|---|---|---|
| 2,635,462 | 4/1953 | Poole et al. |
| 2,821,084 | 1/1958 | Altfillisch et al. |
| 2,877,649 | 3/1959 | Powers |
| 3,456,491 | 7/1969 | Brockhaus |
| 4,127,028 | 11/1978 | Cox et al. |
| 4,187,721 | 2/1980 | Smith |
| 4,192,184 | 3/1980 | Cox et al. |
| 4,252,028 | 2/1981 | Smith et al. |
| 4,311,054 | 1/1982 | Cox et al. |

FOREIGN PATENT DOCUMENTS

| | | |
|---|---|---|
| 44-18531 | 8/1969 | Japan |
| 159678 | 12/1963 | U.S.S.R. |
| 171651 | 5/1965 | U.S.S.R. |
| 426170 | 4/1974 | U.S.S.R. |
| 486247 | 9/1975 | U.S.S.R. |

OTHER PUBLICATIONS

Continuous Measurement of Unsteady Flow, by G. P. Katys, translated from the Russian by D. P. Barrett, MacMillan Company, New York, 1964.

Primary Examiner—Charles A. Ruehl
Attorney, Agent, or Firm—Memel, Jacobs, Pierno & Gersh

[57] ABSTRACT

A flow meter apparatus for measuring the mass flow rates of fluids passed through two essentially parallel, cantilever mounted U-shaped flow tubes where, instead of the fluid serially passing through one of the U-shaped flow tubes and then through the second U-shaped flow tube, the fluid is essentially evenly divided and half of the fluid is passed through one U-shaped flow tube and the other half of the fluid is passed through the other U-shaped flow tube. The two U-shaped flow tubes are sinusoidally driven as the tines of a tuning fork, and when a fluid is passed through the oscillating U-shaped flow tubes Coriolis forces are generated which torsionally deflect the U-shaped flow tubes. Such torsional deflections are a function of the mass flow rate of the fluid passing through the two U-shaped flow tubes.

10 Claims, 3 Drawing Figures

FIG. 1

PARALLEL PATH CORIOLIS MASS FLOW RATE METER

BACKGROUND OF THE INVENTION

In the art of measuring mass flow rates of flowing substances it is known that flowing a fluid through a rotating or oscillating conduit produces Coriolis forces which are perpendicular to both the velocity of the mass moving through the conduit and the angular velocity vector of the rotation or oscillation of the conduit. It is also known that the magnitude of such Coriolis forces is related to the mass flow rate as a function of the angular velocity of the conduit.

One of the major technical problems previously associated with Coriolis mass flow rate instruments was the accurate measurement of Coriolis force effects such as conduit deflection. This problem arises in part because the magnitude of the Coriolis forces for moderate mass flow rates and reasonable angular velocities may be very small, resulting in small conduit deflections or other effects, which necessitates the use of sensitive and accurate instrumentation. Furthermore, in order to determine the mass flow rate passing through the conduit as a function of the magnitude of the generated Coriolis forces, the magnitude of the angular velocity of the conduit must also be either accurately measured or precisely controlled.

A mechanical configuration and measurement technique which, among other advantages, avoid the need to measure or control the magnitude of the angular velocity of the conduit, and concurrently provide requisite sensitivity and accuracy of measurement of the effects caused by generated Coriolis forces is taught in U.S. Pat. No. Re. 31,450. The mechanical configuration disclosed in that patent incorporates a resilient U-shaped flow tube which has no pressure sensitive joints, and is cantilever mounted at the open ends of the U-shaped flow tube so as to be capable of being elastically oscillated about an axis perpendicular to the side legs of the U-shaped flow tube, which axis is located near the fixed mounting and in the plane in which the U-shaped flow tube lies when at rest; i.e., the midplane of oscillation. When a substance is flowing through the U-shaped flow tube, and that tube is thus mounted, oscillation of the filled U-shaped flow tube so that its free end passes through the mid-plane of oscillation, causes the generation of a Coriolis force couple which can elastically deflect the free end of the U-shaped flow tube about an axis located in the plane of the U-shaped flow tube midway between and parallel to the side legs of the U-shaped flow tube. By designing the mounted U-shaped flow tube so that it has a resonant frequency about the axis perpendicular to the side legs of the U-shaped flow tube that is lower than the resonant frequency about the axis parallel to the side legs of the U-shaped flow tube and by then oscillating the U-shaped flow tube about the axis perpendicular to the side legs of the U-shaped flow tube at its resonant frequency, a mechanical situation is created whereby the forces which oppose the generated Coriolis forces are predominantly linear spring forces. This fact, that the forces opposing the generated Coriolis forces are predominantly linear spring forces, causes one side leg of the U-shaped flow tube to pass through the mid-plane of oscillation before the other side leg does so, in a linear fashion. Occurrence of these events results in a situation where measurement of the time interval between the passage of the respective side legs through the mid-plane of oscillation provides a direct means, without regard to the angular velocity of the U-shaped flow tube or other variable terms, for calculating the mass flow rate of the fluid passing through the U-shaped flow tube. Such time difference measurements can accurately be made by using optical sensors as disclosed in U.S. Pat. No. Re. 31,450, or by using electromagnetic velocity sensors as disclosed in U.S. Pat. No. 4,422,338.

Also included as part of the mechanical configuration for the Coriolis mass flow rate instruments as taught in U.S. Pat. No. Re. 31,450 is cantilever mounting of a second structure in conjunction with the U-shaped flow tube. This second structure is so mounted and designed that when it is sinusoidally driven in opposition to the U-shaped flow tube the combination of the second structure and the U-shaped flow tube operate as a tuning fork. Among the advantages achieved by tuning fork operation is substantial attenuation, at the support, of vibration forces associated with the sinusoidal driving of the U-shaped flow tube and the second structure. This attenuation of vibration forces at the support from which the U-shaped flow tube and the second structure are cantilever mounted is not only a desirable consequence because of the long term fatigue effects vibration forces could have on the mounting structure of the meter, but also is a very important consequence because of the errors such vibration forces could introduce into the time interval measurements of the passage of the respective side legs through the mid-plane of oscillation. The error referred to here is critical, because the accuracy with which the time interval measurements are made is directly proportional to the determination of mass flow rate. Effects of vibrations which could produce errors in the time interval measurements include vibration induced displacement of structures on which sensors are mounted to indicate passage of the respective side legs of the U-shaped flow tube through the mid-plane of oscillation. Displacement of such structures with respect to the mid-plane of oscillation, accordingly, render signals from the sensors inaccurate.

As taught in U.S. Pat. No. Re. 31,450 the cantilever mounted second structure is a spring arm. Substituting for the spring arm a second flow tube similarly configured to the first flow tube, an expedient within the ordinary skill of the art, provides an inherently balanced tuning fork structure because of the symmetries incorporated in the operation of the tines. Recognition of this fact has been used in the design of densimeters where measurements of the resonance frequency of cantilever mounted filled flow tubes are made to determine the density of fluids in the tubes, see, e.g., U.S. Pat. No. 2,635,462 and 3,456,491.

The double flow tube configuration has also been used for making mass flow rate measurements, see, e.g., U.S. Pat. Nos. 4,127,028; 4,192,184; and 4,311,054. These double flow tube meters utilize a fluid flow path wherein the fluid enters one leg of one of the flow tubes, through which it is passed, and then is transported via an interconnecting conduit to the second flow tube, through which it is passed, before exiting from the meter. Such a fluid flow path through the two flow tubes can be accurately described as a serial flow path configuration.

Inherently associated with series type double flow tube meters is a doubling of the fluid pressure drop across the meter. This results from the fact that all the fluid has to pass through two flow tubes as opposed to one. Such fluid pressure drops are a detrimental feature associated with monitoring fluid flow because as the pressure drop increases, compensating augmentation of fluid pumping is required to offset losses in the fluid pressure delivered from the conduit system incorporating series type double flow tube meters.

SUMMARY OF THE INVENTION

Many structural dimensions for Coriolis flow meters, which use cantilever mounted U-shaped flow tubes, are effectively dictated by the quantity of fluid to be measured. A primary example of how dimensions for such flow meters are related to the quantity of fluid to be measured is the sizing of the inside diameter of the U-shaped flow tube. This sizing can be understood by considering the fact that it is the cross-sectional area of the supply conduit and drain conduit connected to the flow meter which substantially controls the quantity of fluid capable of being passed through the flow meter. Therefore, the cross-sectional area of these conduits should in part be determinative of the inside diameter of the U-shaped flow tube. This is true and is appreciated after recognizing that if the inside diameter of the U-shaped flow tube results in a cross-sectional area smaller than that of the supply conduit and drain conduit then the fluid pressure drop caused by the flow meter would be larger than that caused by a U-shaped flow tube with an inside diameter that provides a cross-sectional area equal to that of the supply conduit and drain conduit. Such increases in fluid pressure drops, as explained above, are undesirable. Conversely, an inside diameter for the U-shaped flow tube which results in a cross-sectional area larger than that of the supply conduit and drain conduit means that the U-shaped flow tube is larger and this results in such unnecessary and unwanted features as added weight and increased manufacturing cost. Thus, the inescapable conclusion is that as the quantity of fluid to be measured is increased so is the size of the flow meter.

A significant design problem, accordingly, associated with vibrating U-shaped flow tube Coriolis flow meters is compensating for the adverse effects resulting from the increased physical size of the flow meter dictated by increased quantities of fluid.

In the present invention the adverse effects resulting from increased physical size are substantially reduced by a configuration utilizing two flow tubes where the flow through the flow meter permits use of smaller U-shaped flow tubes. This configuration is based on essentially evenly dividing the flow of fluid injected into the meter, and then conducting one half of the flow through one U-shaped flow tube and the other half through a second U-shaped flow tube. At the output ends of each flow tube the ejected fluid is collected for injection into the drain conduit.

The two U-shaped flow tubes through which fluid is passed are arranged in a tuning fork configuration with the direction of fluid flow in the adjacent legs of the two U-shaped flow tubes being parallel. Coriolis forces are produced when the two U-shaped flow tubes are sinusoidally driven with fluid flowing through them. These Coriolis forces alternately deflect adjacent legs of the two U-shaped flow tubes. The alternating deflections result in configurations, at the instant when the vibrating tubes are at their mid-planes of oscillation, wherein one pair of adjacent legs is deflected closer together and the other pair is deflected apart. As will be explained below, the fluid mass flow rate passing through the meter can be determined by mounting sensors on the side legs of these U-shaped flow tubes so that the time required for the side legs of each U-shaped flow tube to pass through the mid-plane of oscillation can be measured.

The accuracy in making fluid mass flow rate measurements with such a parallel path flow meter will be dependent on both the accuracy with which fluid flow is evenly divided between the two U-shaped flow tubes, and the equivalence of the angular velocities with which the two U-shaped flow tubes are sinusoidally driven. For, if a higher mass flow rate is passing through one U-shaped flow tube than the other, the U-shaped flow tube conducting the higher mass flow rate will generate larger Coriolis force effects. Similarly, if one U-shaped flow tube is sinusoidally driven at a higher angular velocity than the other, the U-shaped flow tube driven at the higher angular velocity will generate larger Coriolis force effects. Such unbalanced increases in the generated Coriolis forces result in uncertainties as to measured and actual fluid mass flow rates passing through the flow meter. However, as will be explained below, for the parallel flow path configuration of the present invention these two sources of error—uneven division of fluid flow and unequal angular velocities for the sinusoidally driven U-shaped flow tubes—are not cummulative in their effect but instead only degrade accurate mass flow rate measurements in relationship to the product of their magnitudes. So if both parameters of concern here are unequal in amounts on the order of ten percent the uncertainty as to the measurement of the total mass flow rate passing through the configuration of the present invention for Coriolis flow meters will only be on the order of one percent. Such substantial reductions in the uncertainty of measuring fluid mass flow rates passing through parallel path Coriolis mass flow rate meters have been demonstrated, and test data is presented below.

Advantages resulting from the parallel double flow path configuration, include among others: (a) increased sensitivity over a Coriolis flow meter configuration with a single flow tube or a series flow path configuration, because for the parallel path configuration the pressure rating for the two flow tubes equals that of the supply conduit which results in tubing with thinner walls and, therefore, tubing that is more sensitive to generated Coriolis forces; (b) more stable operation compared to a single flow tube combined with a non-fluid conducting member configured as a tuning fork, because the parallel path configuration with fluid passing through both flow tubes results in a dynamically balanced pair of tuning fork tines, i.e., as the mass of one tine varies due to increased fluid density so will the mass of the other tine; (c) substantially decreased sensitivity to external vibration sources which can affect the accuracy of measuring the time required for the side legs of a flow tube to pass through the mid-plane of oscillation, because for the parallel path configuration the sensors are mounted on the flow tubes without physical reference to any structure needing to be immutably fixed with respect to the mid-planes of oscillation for the U-shaped flow tubes; (d) reduced overall meter size, as compared to either the single flow tube configuration or the series double tube flow path which inherently results in a configuration that is cheaper and easier to build; and, (e) less of a fluid pressure drop caused by the parallel path configuration as compared to the series double tube flow path because the length of tubing which the fluid has to pass through is reduced by one-half.

Clearly, as with the instruments disclosed and claimed in U.S. Pat. Nos. Re. 31,450 and 4,422,338, the present invention provides a direct method, utilizing an essentially autonomous apparatus, for measuring the mass flow rate of fluids. Only insertion onto the conduit transporting the fluid to be measured is required. No special piping, pumping or reference standards are required. There is a difference, however, with respect to actual field installation between the present invention and those disclosed in U.S. Pat. Nos. Re. 31,450 and 4,422,338. This difference is that the present invention can be affixed to a conduit and separate mounting of the meter case is not required as it is for the meters disclosed in U.S. Pat. Nos. Re. 31,450 and 4,422,338. In fact the meter of the present invention can be supported by the structure of the conduit transporting the fluid to be measured.

BRIEF DESCRIPTION OF THE DRAWINGS In the drawings:

FIG. 2 is a perspective view of a mass flow rate meter according to the present invention showing a different configuration for the inlet and outlet manifolds; and, FIG. 3 is an end view of a simplified illustration of the mass flow rate meter of FIGS. 1 and 2 showing the orientation of the two U-shaped flow tubes as they approach their respective mid-planes of oscillation.

DETAILED DESCRIPTION OF THE INVENTION

Figure 1:
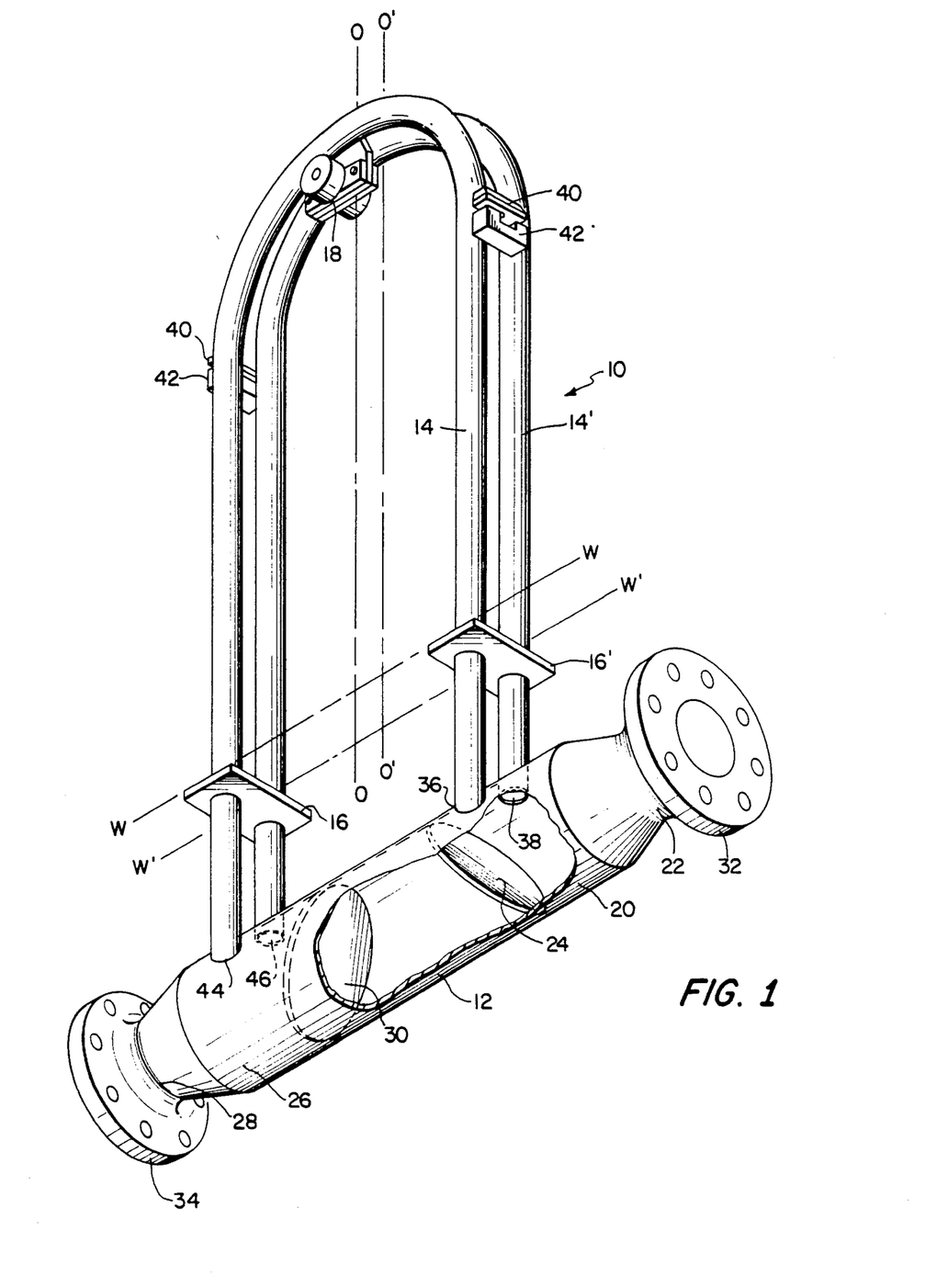
FIG. 1 is a perspective view of a mass flow rate meter according to the present invention.

Referring now to the drawings, wherein corresponding components are designated by the same reference numerals throughout the various figures, a mass flow rate measuring device according to the invention is illustrated in FIG. 1 and generally designated by reference numeral 10. Measuring device 10 includes pipe 12 from which two U-shaped flow tubes 14 and 14' are cantilever mounted in substantially parallel fashion. The two U-shaped flow tubes 14 and 14' are free of pressure sensitive joints. Fixedly attached to both U-shaped flow tubes 14 and 14' are supports 16 and 16' which in combination with pipe 12 provide a cantilever mounting for U-shaped flow tubes 14 and 14'. These supports, 16 and 16', are sufficiently spaced from pipe 12 so that the combination of the supports 16 and 16' with pipe 12 provides a rigid structural connection between the U-shaped flow tubes 14 and 14'. In order to provide necessary rigidity, the spacing between pipe 12 and supports, 16 and 16', should approximate at least three times the diameter of U-shaped flow tubes 14 and 14'.

The U-shaped flow tubes 14 and 14' are selected and mounted so as to have substantially the same moments of inertia and spring constants about bending axes W—W and W'—W' respectively. These bending axes are perpendicular to the side legs of U-shaped flow tubes 14 and 14', and are located near and in front of supports 16 and 16'. Since U-shaped flow tubes 14 and 14' are cantilever mounted in an essentially parallel fashion with free ends and have substantially equal moments of inertia and equal spring constants about their respective bending axes, these U-shaped flow tubes can be sinusoidally driven in opposition about their bending axes at essentially the same resonant frequency so as to function as the tines of a tuning fork. The sinusoidal driving forces are applied to U-shaped flow tubes 14 and 14' in the preferred embodiment by drive mechanism 18. Drive mechanism 18 can consist of such known means as a magnet and a coil through which an oscillating electrical current is passed or can consist of any other arrangement for applying forces to U-shaped flow tubes 14 and 14' so that these tubes are sinusoidally driven about their respective bending axes, W—W and W'—W' at their common resonant frequency, whereby the tubes operate as the two tines of a tuning fork.

The side legs of U-shaped flow tubes 14 and 14' are fixedly attached to pipe 12 at manifold 20 so as to permit flow of fluid from inlet pipe 22 into the U-shaped flow tubes through the plenum formed by manifold 20 and end plate 24, which is attached to pipe 12 in a fluid tight manner. The flow of fluid out of the U-shaped flow tubes is achieved by having the U-shaped flow tubes 14 and 14' fixedly attached to pipe 12 at manifold 26 so as to permit flow of fluid from the U-shaped flow tubes into exit pipe 28 through the plenum formed by manifold 26 and end plate 30, which is attached to pipe 12 in a fluid tight manner. Inlet pipe 22 and exit pipe 28 are attached to flanges 32 and 34 respectively. Flanges 32 and 34 are used to connect the measuring device 10 to the conduit system (not shown) through which the fluid mass flow rate to be measured is supplied and drained from the flow meter. The plenum formed by manifold 20 and end plate 24 is so configured that fluid flow from inlet pipe 22 is essentially evenly divided between U-shaped flow tubes 14 and 14'. This is accomplished by using several design criteria including the fabrication of each of the U-shaped flow tubes 14 and 14' such that both have essentially equal and uniform inside cross sectional areas, and both have essentially equal internal volumes for fluid containment. Further, manifold 20 is configured so that inlets 36 and 38 to U-shaped flow tubes 14 and 14' are located essentially at symmetrical locations with respect to the flow profile from inlet pipe 22 (i.e., one inlet is not downstream with respect to the other when distance is measured from the exit of inlet pipe 22 at manifold 20). Such symmetrical positioning of inlets 36 and 38 contributes to assuring essentially equal fluid pressure at these inlets. In addition to the location of inlets 36 and 38 on manifold 20, the inlet plenum formed by manifold 20 and plate 24 has symmetrical boundaries with respect to inlets 36 and 38, and the inlet plenum is large enough to produce an essentially uniform fluid pressure in the region where inlets 36 and 38 are located. Likewise, the exit plenum formed by manifold 26 and plate 30 has symmetrical boundries with respect to outlets 44 and 46, and the outlet plenum is large enough to permit equalization of fluid pressure differentials produced by fluid exiting U-shaped flow tubes 14 and 14' so that essentially equal fluid back pressures are present in the region where outlets 44 and 46 are located.

Figures 2, 3:
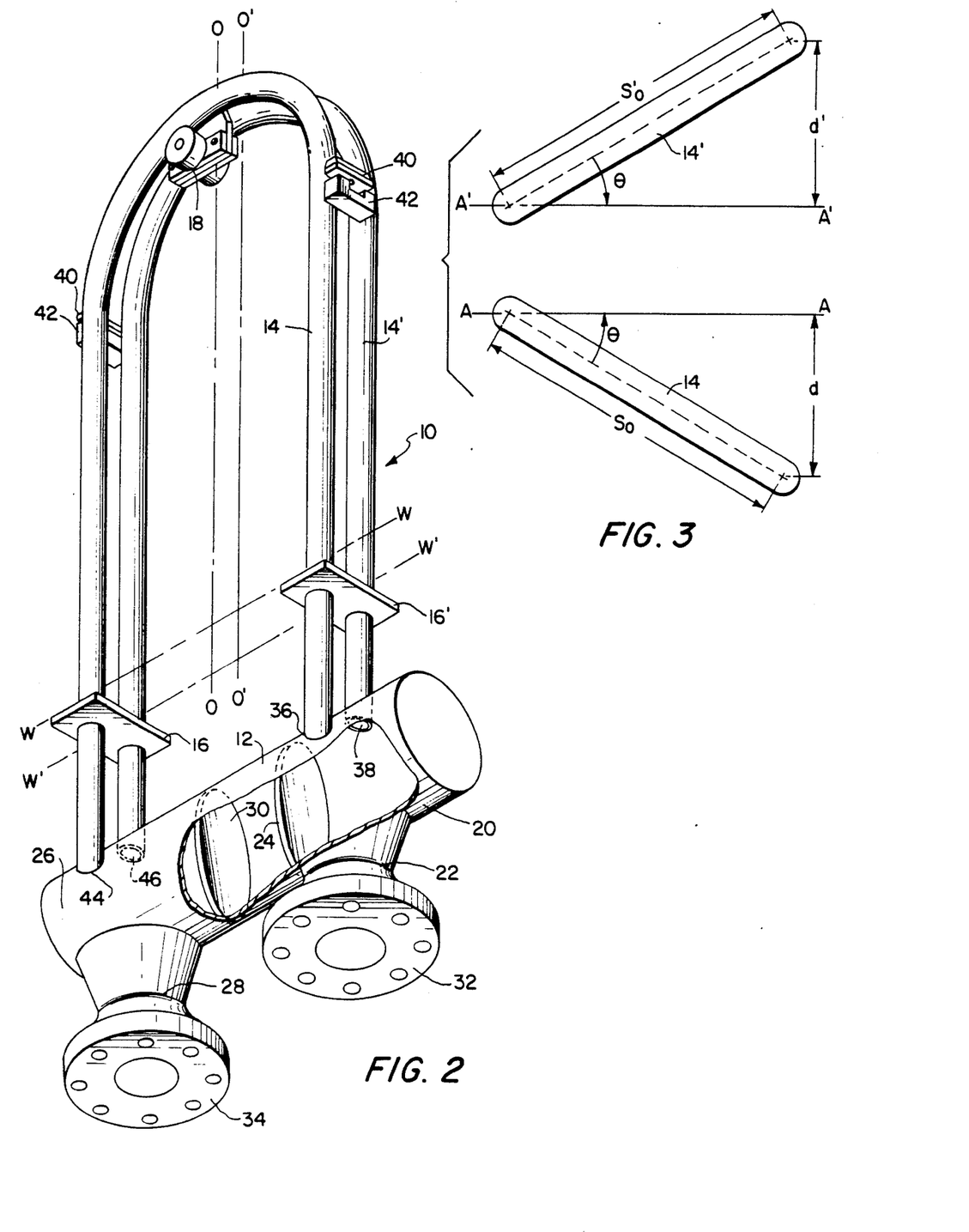

In the preferred embodiment shown in FIG. 1 the inlet pipe 22, exit pipe 28, manifolds 20 and 26, and U-shaped flow tubes 14 and 14' are shown configured so that the mass flow rate measuring device 10 can be connected to a fluid conducting conduit in an essentially straight line fashion. An alternative configuration for inlet pipe 22, exit pipe 28, manifolds 20 and 26, and U-shaped flow tubes 14 and 14' is shown in FIG. 2. As in FIG. 1, the configuration shown in FIG. 2 incorporates the design features which facilitate even division of fluid mass flow rate flow through U-shaped flow tubes 14 and 14'. However, unlike the configuration shown in FIG. 1, the configuration shown in FIG. 2 permits connection, at flanges 32 and 34, to a fluid conducting conduit by other than a straight line connection while still accomplishing the essentially even division of fluid mass flow rate from inlet pipe 22 into U-shaped flow tubes 14 and 14', as required by the present invention.

With the fluid flow path configuration as described above and the sinusoidal driving of U-shaped flow tubes 14 and 14' as the tines of a tuning fork it is recognized that the Coriolis forces generated along adjacent side legs of U-shaped flow tubes 14 and 14' will be in opposite directions. Explanation for this phenomenon is provided by the fact that the fluid mass flow rates through U-shaped flow tubes 14 and 14' are essentially parallel and in the same direction while the angular velocity vectors for the oscillating U-shaped flow tubes 14 and 14' are also essentially parallel but are in opposite directions because of the tuning fork type operation of the device. Accordingly, during one half cycle of the oscillation of U-shaped flow tubes 14 and 14' the side legs attached to manifold 20 will be forced closer together, by the generated Coriolis forces, than the side legs attached to manifold 26, while during the other half cycle of oscillation the Coriolis produced forces against the side legs of U-shaped flow tubes 14 and 14' will be reversed. The Coriolis forces, and their effect upon the side legs of U-shaped flow tubes 14 and 14', will be greatest when the angular velocities of U-shaped flow tubes 14 and 14' are a maximum. This condition essentially occurs when the U-shaped flow tubes 14 and 14' are passing through their mid-planes of oscillation.

During oscillation of U-shaped flow tubes 14 and 14' those adjacent side legs which are forced closer together than their counterpart side legs, will pass through the mid-planes of oscillation before their counterparts. The time interval which elapses from the first side legs passing through the mid-planes of oscillation to the passing of the counterpart side legs, i.e., those forced further apart, is proportional to the total mass flow rate passing through device 10. Below it will be shown that (a) the proportionality factor between this time interval and the total mass flow rate passing through device 10 is composed of constants determined by the mechanical configuration of device 10; and, (b) the uncertainty in measurement of the total mass flow rate is only the product of the differences in the mass flow rates passing through U-shaped flow tubes 14 and 14' and the differences in the angular velocities at which U-shaped flow tubes 14 and 14' are sinusoidally driven.

To measure the time interval, coils 40 are attached near the free ends of the side legs of either U-shaped flow tube 14 or 14', and permanent magnets 42 are attached near the free ends of the side legs of the other U-shaped flow tube so as to have the coils 40 located in the volume of space surrounding the permanent magnets 42 in which the magnetic flux fields are essentially constant. With this configuration the electrical signal outputs generated by coils 40 can be processed in the manner taught in U.S. Pat. No. 4,422,338 to provide a measure of the time interval. Further, as taught in U.S. Pat. No. Re. 31,450, the time interval measurements made during one half cycle of the oscillation of U-shaped flow tubes 14 and 14' can be subtracted from the time interval measurements made during the other half cycle of the oscillation of U-shaped flow tubes 14 and 14', in order to eliminate errors caused by misalignment of the U-shaped flow tubes, so that the difference measurement is proportional to the total mass flow rate passing through device 10.

Essential to the accuracy of the fluid mass flow rate measurements made by device 10 is the design requirement that the generated Coriolis forces which act on U-shaped flow tubes 14 and 14' be opposed by linear elastic forces. This design requirement can be satisfied since the deflections caused by the Coriolis forces will be small. For with small deflections, the opposing forces, if they are substantially equal to the product of torsional spring constants times angular deflections, will be essentially linear. To ensure that the opposing forces are linear torsional spring forces, the U-shaped flow tubes 14 and 14' are so configured about their cantilever mountings that the resonant frequency about the bending axes W—W and W'—W' is lower than the resonant frequency about the torsion axes O—O and O'—O'. These torsion axes are located essentially midway between and parallel to the side legs of U-shaped flow tubes 14 and 14' and are in the same plane as the side legs for each of these U-shaped flow tubes. It is about these torsion axes, O—O and O'—O', that the generated Coriolis forces act.

The requirement for the resonant frequency about the bending axes W—W and W'—W' to be lower than the resonant frequency about the torsion axes O—O and O'—O' includes the further constraint that the resonant frequency about the torsion axes O—O and O'—O' not be equal to or near any odd harmonic value (i.e., an odd multiple) of the resonant frequency about the bending axes W—W and W'—W'. The requirement regarding avoiding equal or odd harmonic values of the resonant frequencies about the bending axes W—W and W'—W' essentially eliminates all physical effects synchronized with the Coriolis forces at coils 40 and magnets 42 which are caused by forces other than Coriolis forces. So by avoiding equal or odd harmonic values of the resonant frequencies about the bending axes W—W and W'—W', the signals produced by coils 40 and magnets 42 will be essentially caused only by Coriolis force induced effects.

To enhance the understanding of how U-shaped flow tube 14 functions in a cooperative way with U-shaped flow tube 14' to measure the total mass flow rate of the fluid passing through device 10, and to show what is the magnitude of the error in such total mass flow rate measurements caused by (a) differences in the fluid mass flow rates passing through U-shaped flow tubes 14 and 14' and (b) differences in the angular velocities about bending axes W—W and W'—W', the following mathematical relationships are provided:

Due to the fact that intermittent time interval measurements are being made while fluid is flowing through sinusoidally driven U-shaped flow tubes 14 and 14' the physical configuration which has to be analyzed can be drawn as shown in FIG. 3. Here a plan view from the free end of U-shaped flow tubes 14 and 14' is shown and lines A—A and A'—A' indicate the respective mid-planes of oscillation with the left side legs of both U-shaped flow tubes 14 and 14' having just arrived at these mid-planes of oscillation. The right side legs of U-shaped flow tubes 14 and 14' are respectively distances d and d' from these mid-planes of oscillation. The summation of distances d and d' will be identified as D, and can be calculated according to the following relationship.

$$D = S\theta + S'\theta' = S_o(\theta + \theta')$$

where
- S and S' are the distances between the side legs of U-shaped flow tubes 14 and 14' respectively; and since these distances are essentially equal they can be identified by the term $S_o$,
- $\theta$ is the angle of deflection from the mid-plane of oscillation A—A at which U-shaped flow tube 14 is caused to be located at the instant depicted in FIG. 3 by generated Coriolis forces, $\theta'$ is the angle of deflection from the mid-plane of oscillation A'—A' at which U-shaped flow tube 14' is caused to be located at the instant depicted in FIG. 3 by generated Coriolis forces.

Knowing that the torques which oppose the generated Coriolis forces are equal to the product of (a) the torsional spring constants about axes O—O and O'—O' for each of the U-shaped flow tubes and (b) the angles of deflection $\theta$ and $\theta'$ respectively, the above equation can be written as follows:

$$D = S_o \left( \frac{T}{K} + \frac{T'}{K'} \right) = S_o \left( \frac{T + T'}{K_o} \right) \quad \text{(equation 1)}$$

where
- T and T' are the magnitudes of the individual torques opposing generated Coriolis forces for each of U-shaped flow tubes 14 and 14' respectively, K and K' are the individual torsional spring constants for each of U-shaped flow tubes 14 and 14' about axes O—O and O'—O' respectively, $K_o$ is the essentially common value for the torsional spring constant about either axis O—O or O'—O' because these torsional spring constants are essentially of equal value as a result of design criteria for the construction of device 10.

Since an opposing generated Coriolis force couple is produced about both torsion axes O—O and O'—O' the magnitudes of the torques T and T' can also be expressed as:

$$T = S_o F_c \quad \text{(equation 2)}$$

$$T' = S_o F_c' \quad \text{(equation 3)}$$

where $F_c$ and $F_c'$ are the magnitudes of the opposing generated Coriolis forces acting about torsion axes O—O and O'—O' respectively.

It is known that the magnitude of the generated Coriolis force for a configuration such as sinusoidally driven U-shaped flow tube 14 can be written as:

$$F_c = 2 Q_o W_o L_o$$

where
- $Q_o$ is the mass flow rate passing through the U-shaped flow tube 14,
- $W_o$ is the angular velocity at which the U-shaped flow tube 14 is being oscillated about the bending axis W—W,
- $L_o$ is the length over which the Coriolis forces are generated, i.e., the distance from the bending axis W—W to the free end of the U-shaped flow tube 14.

Substituting this last relationship in equations 2 and 3 and then rewriting equation 1, accordingly, results in the following:

$$D = 2 L_o S_o^2 \left( \frac{Q_o W_o + Q_o' W_o'}{K_o} \right) \quad \text{(equation 4)}$$

Here the primed terms $Q'_o$ and $W'_o$ are used to denote the values associated with these variables for U-shaped flow tube 14'.

All of the above expressions have been based on an essentially instantaneous static analysis. Considering a dynamic representation for D the following can be written.

$$D = L_1 (W_o + W'_o) \Delta t$$

where
- $L_1$ is the distance from the bending axes W—W or W'—W' to the location where the coils 40 and magnets 42 are located, which as a result of design criteria discussed. above is an essentially equal term for both U-shaped flow tubes 14 and 14' and, therefore, results in the use of a single factor,
- $\Delta t$ is the time interval required for the second set of side legs to pass through their respective mid-planes of oscillation.

Now combining this last relationship with equation 4 results in the following:

$$\frac{K_o L_1}{2 L_o S_o^2} \Delta t = \frac{Q_o W_o + Q_o' W_o'}{W_o + W_o'} \quad \text{(equation 5)}$$

The right hand side of this last equation provides an unsimplified expression for the dependency of fluid mass flow rate measuring device 10 on the differences in the fluid mass flow rates passing through U-shaped flow tubes 14 and 14', and on the differences in the angular velocities about axes W—W and W'—W'. For if $Q_o = Q'_o$ and $W_o = W'_o$ the right hand side of the above equation would simplify to $Q_o$, half of the mass flow rate passing through device 10, without a dependency on the angular velocities about axes W—W or W'—W'.

To simplify the right hand side of the last equation average value Q for the fluid mass flow rate passing through U-shaped flow tubes 14 and 14', and $W_1$ for the average angular velocity at which the U-shaped flow tubes 14 and 14' are driven will be incorporated into the equation. In order to accomplish this insertion the following relations will be used.

$$Q_o = Q + \Delta Q$$
$$Q'_o = Q - \Delta Q$$
$$W_o = W_1 + \Delta W_1$$
$$W'_o = W_1 - \Delta W_1$$

Here the terms $\Delta Q$ and $\Delta W_1$ represent the differences from the average values associated with U-shaped flow tubes 14 and 14'. Substituting these terms in equation 5 results in the following expression after multiplication and combination of terms.

$$\frac{K_o L_1}{2 L_o S_o^2} \Delta t = Q + \Delta Q \left( \frac{\Delta W_1}{W_1} \right) \quad \text{(equation 6)}$$

Now it is seen that the first term, Q, on the right hand side of the equation represents the average mass flow rate passing through either U-shaped flow tube 14 or 14', and that the second term, $\Delta Q(\Delta W_1/W_1)$, represents the error associated with using mass flow rate measuring device 10, if the mass flow rates passing through U-shaped flow tubes 14 and 14' are unequal and the angular velocities associated with U-shaped flow tubes 14 and 14' are unequal. This error is the product of the difference in mass flow rates passing through U-shaped flow tubes 14 and 14' from the average mass flow rate passing through those flow tubes, times the percentage of difference from the average angular velocity about axes W—W and W'—W'. Clearly, as either of these differences, $\Delta Q$ or $\Delta W_1$, increase, their resulting contribution to the uncertainty in the measurement of the mass flow rate made by device 10 is decreased due to the fact that the increased term is multiplied by the other and also because of the fact that this product of $\Delta Q$ and $\Delta W_1$ is divided by the average angular velocity which even further reduces the absolute value of the error term. For example if either $\Delta Q$ or $\Delta W_1$ are zero, the error in mass flow rate measurements is zero, or in the alternative if $\Delta Q$ is as large as one-tenth of the value of Q and $\Delta W_1/W$ is ten percent then the total error is only one percent of the total mass flow rate of the fluid passing through device 10.

Finally equation 6 shows that by measuring the time interval $\Delta t$ the mass flow rate of the fluid passing through device 10 can be calculated as a linear proportional factor of only essentially invariable physical constants associated with the design of device 10 times $\Delta t$.

Flow meter configurations shown in both FIGS. 1 and 2 have been built and tested. Those meters configured for straight line connection, i.e. those shown in FIG. 1, have been built in the following sizes and have measured fluid mass flow rates with the accuracies listed in Table 1. The indicated accuracies are determined by using methods traceable to a procedure where for a determined period of time a quantity of fluid is passed through the flow meter being tested and the weight of that quantity of fluid is measured.

TABLE 1

| Diameter of Supply and Drain Conduit (inches) | Diameter of U-shaped flow tubes 14 and 14' (inches) | Pipe 12 diameter (inches) | Volumes of Inlet and Outlet Plenums (in$^3$) | Accuracy of Mass Flow Rate Measurements (Percent) |
|---|---|---|---|---|
| 2.0 | 1.5 | 4.0 | 60 | ±0.3 |
| 3.0 | 2.0 | 6.0 | 400 | ±0.1 |
| 6.0 | 4.5 | 10.0 | 1800 | ±0.5 |

Meters as shown in FIG. 2 have been built in the following sizes and have measured fluid mass flow rates with the accuracies listed in Table 2.

TABLE 2

| Diameter of Supply and Drain Conduit (inches) | Diameter of U-shaped flow tubes 14 and 14' (inches) | Pipe 12 diameter (inches) | Volumes of Inlet and Outlet Plenums (in$^3$) | Accuracy of Mass Flow Rate Measurements (Percent) |
|---|---|---|---|---|
| 0.5 | 0.25 | 0.875 | 1.4 | ±0.25 |
| 1.5 | 0.75 | 2.0 | 4.4 | ±0.1 |
| 2.0 | 1.5 | 4.0 | 75.0 | ±0.4 |

The above discussion and related illustrations of the present invention are directed primarily to preferred embodiments and practices of the invention. However, it is believed that numerous changes and modifications in the actual implementation of the concepts described herein will be apparent to those skilled in the art, and it is contemplated that such changes and modifications may be made without departing from the scope of the invention as defined by the following claims.

What is claimed is:

1. An apparatus for measuring the mass flow rate of a fluid, comprising:
    (A) an inlet manifold and an outlet manifold;
    (B) two U-shaped flow tubes which
        (i) are free of pressure sensitive joints,
        (ii) are mounted in an essentially parallel fashion and fixedly attached, in a fluid tight manner, at the open ends of said U-shaped flow tubes to said inlet manifold and said outlet manifold,
        (iii) extend from said inlet manifold and outlet manifold in a cantilever fashion,
        (iv) each have an bending axis located near said fixedly attached ends and located in the same plane as and perpendicular to the side legs of said U-shaped flow tube, and a torsion axis located in the same plane as the side legs of said U-shaped flow tube, essentially parallel to and midway between said side legs, and perpendicular to said bending axis,
        (v) have essentially equal moments of inertia and essentially equal spring constants about said bending axes, and essentially equal moments of inertia and essentially equal spring constants about said torsion axes, and
        (vi) have a resonant frequency of oscillation about said torsion axes which is both different from the resonant frequency of oscillation about said bending axes, and different from the odd harmonic values of said resonant frequency of oscillation about said bending axes;
    (C) means for inputting to each of said U-shaped flow tubes essentially equal amounts of fluid from an inlet plenum, formed in part by said inlet manifold so that fluid flows through said U-shaped flow tubes in an essentially parallel fashion;
    (D) means for draining fluid from both of said U-shaped flow tubes through an exit plenum formed in part by said outlet manifold;
    (E) means attached to said U-shaped flow tubes to sinusoidally drive said U-shaped flow tubes at the resonant frequency about said bending axes, and as the tines of a tuning fork; and,
    (F) means to measure the time interval between the passage of the first side legs of each of said U-shaped flow tubes through the respective mid-planes of oscillation, and the passage of the second side legs, caused by Coriolis forced deflection about said torsion axes, to pass through the respective mid-planes of oscillation at a later time;

whereby the total fluid mass flow rate passing through both of said U-shaped flow tubes is determined from the magnitude of said measured time interval.

2. An apparatus as set forth in claim 1 in which the resonant frequency about said bending axes is lower than the resonant frequency about said torsion axes.

3. An apparatus as set forth in claim 1 in which supports are fixedly attached to said side legs of said adjacent U-shaped flow tubes, at a minimum distance from said inlet manifold and outlet manifold of three times the outside diameter of each of said U-shaped flow tubes, so that this combination of said inlet and outlet manifolds and said supports provides a cantilever mounting for said U-shaped flow tubes.

4. An apparatus as set forth in claim 1 in which both of said U-shaped flow tubes have essentially equal and essentially uniform inside cross sectional areas, and both have essentially equal internal volumes for fluid containment.

5. An apparatus as set forth in claim 1 in which the inlets to said U-shaped flow tubes are located on said inlet manifold at symmetrical locations with respect to the fluid flow profile from the conduit supplying fluid to said apparatus.

6. An apparatus as set forth in claim 1 in which said inlet plenum has symmetrical boundaries with respect to said inlets to said U-shaped flow tubes, and said inlet plenum is large enough to produce an essentially uniform fluid pressure in the region where said inlets to said U-shaped flow tubes are located.

7. An apparatus as set forth in claim 1 in which said exit plenum has symmetrical boundaries with respect to the outlets from said U-shaped flow tubes, and said outlet plenum is large enough to permit equalization of fluid pressure differentials produced by fluid exiting from said U-shaped flow tubes so that essentially equal fluid back pressures are presented in the region where said U-shaped flow tube outlets are located.

8. An apparatus as set forth in claim 1 in which the means to measure said time interval substracts the time intervals measured during one half cycle of the oscillation of said U-shaped flow tubes from the time intervals measured during the other half cycle of the oscillation of said U-shaped flow tubes, whereby the difference between the subtracted time interval measurements is proportional to the total fluid mass flow rate passing through both of said U-shaped flow tubes.

9. A method for measuring the mass flow rate of a fluid by generating Coriolis forces, comprising:

(A) flowing said fluid through an inlet plenum, and in a parallel fashion flowing essentially equal amounts of said fluid through two resilient U-shaped flow tubes, said U-shaped flow tubes being fixedly mounted at their open ends to an inlet plenum and an outlet plenum respectively so that both U-shaped flow tubes have essentially equal resonant frequencies of oscillation about their respective bending axes which are located near said fixedly attached ends and in the same plane as and perpendicular to the side legs of said U-shaped flow tubes;

(B) sinusoidally driving said U-shaped flow tubes at said resonant frequency about said bending axes, said resonant frequency being different from the resonant frequency of said U-shaped flow tubes about torsion axes located in the same plane as said U-shaped flow tubes but perpendicular to said bending axes and essentially parallel to and midway between the side legs of said U-shaped flow tubes;

(C) measuring the time interval between the passage of the first side legs of each of said U-shaped flow tubes through the respective mid-planes of oscillation, and the passage of the second side legs, caused by Coriolis forced deflection about said torsion axes, to pass through the respective mid-planes of oscillation at a later time;

whereby the mass flow rate of said fluid is a direct function of the measured time interval.

10. A method for measuring the mass flow rate of a fluid as set forth in claim 9 in which said time interval measured during one half cycle of the oscillation of said U-shaped flow tubes is subtracted from the time interval measured during the other half cycle of the oscillation of said U-shaped flow tubes, whereby the difference between the subtracted time interval measurements is proportional to the total fluid mass flow rate passing through both of said U-shaped flow tubes.

* * * * *

REEXAMINATION CERTIFICATE (807th)
United States Patent [19]
Smith et al.

[11] B1 4,491,025
[45] Certificate Issued Jan. 5, 1988

[54] PARALLEL PATH CORIOLIS MASS FLOW RATE METER

[75] Inventors: James E. Smith, Boulder; Donald R. Cage, Longmont, both of Colo.

[73] Assignee: Micro Motion, Inc., Boulder, Colo.

Reexamination Request:
No. 90/001,173, Feb. 20, 1987

Reexamination Certificate for:
Patent No.: 4,491,025
Issued: Jan. 1, 1985
Appl. No.: 439,035
Filed: Nov. 3, 1982

[51] Int. Cl.⁴ ............................................. G01F 1/84
[52] U.S. Cl. .............................................. 73/861.38
[58] Field of Search .............. 73/32 A, 861.37, 861.38

[56] References Cited

U.S. PATENT DOCUMENTS

| | | |
|---|---|---|
| Re. 31,450 | 11/1983 | Smith . |
| 2,635,462 | 4/1953 | Poole et al. . |
| 2,821,084 | 1/1958 | Alteillisch et al. . |
| 2,877,649 | 3/1959 | Powers . |
| 3,251,226 | 5/1966 | Cushing . |
| 3,444,723 | 5/1969 | Wakefield . |
| 3,456,491 | 7/1969 | Brockhaus . |
| 3,955,401 | 5/1976 | Catherall . |
| 4,127,028 | 11/1978 | Cox et al. . |
| 4,187,721 | 2/1980 | Smith . |
| 4,192,184 | 3/1980 | Cox et al. . |
| 4,252,028 | 2/1981 | Smith et al. . |
| 4,311,054 | 1/1982 | Cox et al. . |
| 4,559,833 | 12/1985 | Sipin . |

FOREIGN PATENT DOCUMENTS

| | | |
|---|---|---|
| 44-18531 | 8/1969 | Japan . |
| 159673 | 12/1963 | U.S.S.R. . |
| 171651 | 5/1965 | U.S.S.R. . |
| 426170 | 4/1974 | U.S.S.R. . |
| 486247 | 9/1975 | U.S.S.R. . |

OTHER PUBLICATIONS

Micro Motion Model C Mass Flow Meter, Instruction Manual, by Micro Motion, Inc., pp. 1–16 (May 1982).
Cox, reissue application Ser. No. 209,352, particularly the paper titled "Protest Under 37 C.F.R. 1.291" by Micro Motion, Inc., pp. 7, 10, 13–15, 18–20 (5/18/81).
Streetor and Wylie, *Fluid Mechanics*, pp. 560–563 (6th Ed., 1975).
"Continuous Measurement of Unsteady Flow" by G. P. Katys, translated from the Russian by D. P. Burrett, MacMillan Company, New York, 1964.

*Primary Examiner*—Charles A. Ruehl

[57] ABSTRACT

A flow meter apparatus for measuring the mass flow rates of fluids passed through two essentially parallel, cantilever mounted U-shaped flow tubes where, instead of the fluid serially passing through one of the U-shaped flow tubes and then through the second U-shaped flow tube, the fluid is essentially evenly divided and half of the fluid is passed through one U-shaped flow tube and the other half of the fluid is passed through the other U-shaped flow tube. The two U-shaped flow tubes are sinusoidally driven as the tines of a tuning fork, and when a fluid is passed through the oscillating U-shaped flow tubes Coriolis forces are generated which torsionally deflect the U-shaped flow tubes. Such torsional deflections are a function of the mass flow rate of the fluid passing through the two U-shaped flow tubes.

FIG. 1

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

* * * * *